Figure 1:
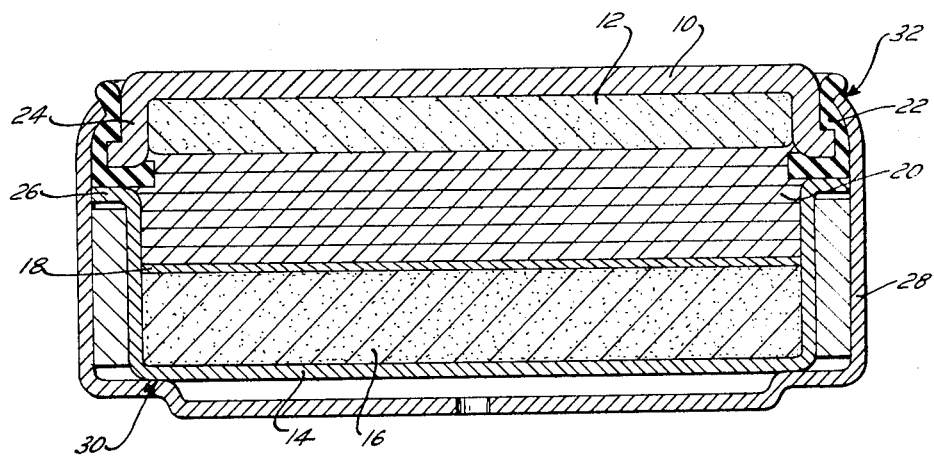

United States Patent

[11] 3,620,848

| [72] | Inventors | James Epstein |
| | | Sharon; |
| | | Charles C. Liang, Andover, both of Mass. |
| [21] | Appl. No. | 822,660 |
| [22] | Filed | May 7, 1969 |
| [45] | Patented | Nov. 16, 1971 |
| [73] | Assignee | P. R. Mallory & Co., Inc. |
| | | Indianapolis, Ind. |

[54] ALKALINE DRY CELL AND PERMANGANATE CATHODE THEREFOR
6 Claims, 1 Drawing Fig.

[52] U.S. Cl. .................................... 136/138, 260/429
[51] Int. Cl. ....................................... H01m15/06
[50] Field of Search .......................... 136/137, 138; 260/102, 567.6, 429

[56] References Cited
UNITED STATES PATENTS

| 2,536,696 | 1/1951 | Ruben ........................ | 136/137 X |
| 2,566,114 | 8/1951 | Bloch ........................ | 136/137 X |
| 3,294,827 | 12/1966 | Swanson ..................... | 260/429 R |

Primary Examiner—Donald L. Walton
Attorney—Robert Levine

ABSTRACT: A cathode depolarizer for alkaline dry cells comprised of active permanganate material having a high degree of insolubility in alkaline electrolytes. A process for producing the permanganate is set forth and the disclosure further describes an alkaline dry cell employing the permanganate cathode depolarizer.

PATENTED NOV 16 1971

3,620,848

INVENTORS
JAMES EPSTEIN
CHARLES C. LIANG
BY
Robert Levine
ATTORNEY

ALKALINE DRY CELL AND PERMANGANATE CATHODE THEREFOR

This invention relates to alkaline dry cells and more particularly to an improved active cathode material for use in such cells and a process for making same.

Active cathode materials used in alkaline dry cells of the type disclosed in Ruben Pat. No. 2,422,045 and in alkaline dry cells in practical use generally consist of certain metallic oxides such as mercuric oxide, silver oxide and the like. To form the cathode depolarizer of these cells, such electrolytically reducible oxygen-yielding compounds are admixed with a smaller amount of finely divided conductive material where the selected compound is of particularly low electrical conductivity. The mixture, for example, mercuric oxide and graphite, is compressed into the bottom of the cathode container to produce a coherent mass of depolarizer material.

The use of active cathode materials of silver and mercuric oxide is particularly desirable since these compounds possess, in addition to relatively good conductivity, a characteristically high degree of insolubility in the alkaline electrolytes. This latter property permits the construction of a cell employing a simple cell separator comprised of microporous chemically inert material accommodating permeation of the electrolyte therethrough into electrical contact with the cathode and yet reducing free flow of the electrolyte to a negligible rate.

In addition to the disclosure of the use of these and other metal oxides as active cathode materials for alkaline dry cells, the Ruben patent disclosed the use of alkali and alkaline earth metal permanganates as active cathode materials, noting such compounds to be somewhat disadvantageous in use despite their desirably high oxidizing value. In particular, the Ruben patent patent recognized the highly soluble nature of these permanganates in alkaline electrolytes and disclosed the need for a barrier of very fine porosity such as ceramic layer in order to retard dissolved active cathode material and prevent same from reaching the cell anode.

The use of barriers of very fine porosity in alkaline cells, or in any liquid electrolyte cell, directly increases internal cell resistance with attendant rise in internal power consumption and reduced cell output voltage. The physical mechanism underlying these results is of course the retardation of free electrolyte flow to a degree well below the negligible rate provided by conventional separators, such as Synpor, filter paper, nylon, etc. Thus, the alkaline dry cell with heretofore known soluble permanganate active cathode material has involved an ineffectual tradeoff between increased oxidizability of active cathode material on the one hand, and increased cell internal resistance on the other hand.

In view of these disadvantages, the use of permanganate active cathode materials is alkaline dry cells has not been commercially adopted, despite the evident improvement in cell output voltage which is inherent in the higher oxidizing capability of permanganate material as compared with the active cathode materials presently in use.

It is an object of the invention to provide active cathode material for use in alkaline dry cells having substantially higher oxidizing power than materials in present practical cells.

It is a further object of this invention to provide permanganate material suitable for use as active cathode material for alkaline dry cells employing cell separators of conventional porosity.

It is another object of this invention to provide a process for making permanganate active cathode material having a sufficiently low degree of solubility in alkaline electrolytes to be suitable for use in practical alkaline dry cells.

In the present invention, there is provided an alkaline dry cell having a cathode depolarizer, the active material of which is a permanganate, an alkaline electrolyte, an anode comprised of a metal compatible with the electrolyte, and a barrier separating the depolarizer and anode, the barrier being of the same type employable with the generally used metallic oxide cathode depolarizers of commercial alkaline cells.

In this invention, applicants have developed permanganate active cathode material characterized by a high degree of insolubility in alkaline electrolytes. They have found further that the permanganate is directly substitutable for mercuric and silver oxide in alkaline dry cells without the need for substitution of the cell separator by barriers of very fine porosity such as fine porosity ceramics.

There is also provided in the present invention a process for making of permanganates suitable for such use in alkaline dry cells. The invention further involves the provision of certain additives for alkaline electrolytes which render the electrolyte of alkaline dry cells essentially incapable of solvating the permanganates of the invention.

Briefly stated, the permanganate active cathode material of the invention may be prepared by reacting a water or alcohol soluble metal permanganate with alkyl quaternary ammonium compounds wherein each alkyl group contains at least three carbon atoms. An insoluble reaction product is recovered and desirably washed and dried. It is then blended with conductive particulate material and this mass is pressed into a cathode container and a cell separator and an electrolyte-containing absorbent are placed thereupon. Cell construction is completed by the addition of an anode compatible with the alkaline electrolyte and subsequent capping and sealing.

The foregoing and other objects and features of the invention will be evident from the following detailed description of the invention and the accompanying drawings.

FIG. 1 is an elevational view, partly in section, of a cell having components selected in accordance with the invention.

Prior to discussing the structure used and the procedure followed in assembling a practical cell in accordance with the invention, the process for making the active cathode material of the invention will be set forth in further detail.

In the above-stated reaction the alkyl quaternary ammonium reagent contains at least three carbon atoms in each alkyl group. Further n-propyl quaternary ammonium chloride or hydroxide is illustrative and preferred, although higher alkyl moieties and other anions may be employed. Suitable metal permanganates include the alkali or alkaline earth metal permanganates, barium permanganate, silver permanganate, etc.

The reactants are either prepared in separate aqueous or ethanol solutions or admixed in a common solution. The following reaction is presumed to occur in the solution: $R_4 N^+OH^{7F^-}+MeMnO_4 \rightarrow R_4 N MnO_4\downarrow+Me OH$ where Me represents alkali or alkaline earth metal and R is an alkyl group containing at least three carbon atoms and suitably up to six or more.

The permanganate precipitate $R_4N MnO_4$ is removed from the composite solution. It is then preferably filtered, washed with distilled water and dried in a vacuum dessicator. The formation of the permanganate precipitate in the process is thought to be attributable primarily to the characteristic bulkiness and heaviness of the quaternary ammonium ion $R_4N^+$. The increased size of the radical ($C \geq 3$) is considered to promote a precipitate of particularly low solubility, a particularly desired characteristic of the permanganate for such considerations as its use in alkaline dry cells.

The permanganate precipitate of the invention is presumed to have generally the following empirical formula:

$$(C_nH_{2n+1})_4 N MnO_4$$

where $n$ is equal to or greater than three.

It will be evident that the process for formation of the permanganate of the invention may be practiced with considerable variation in the selection of cooperating compounds. The formation reaction requires only that there be provided a first compound comprising a water or alcohol soluble metal permanganate and a second quaternary ammonium compound bearing a reactive alkyl radical having at least three carbon atoms.

Following the formation and drying of the permanganate precipitate, it may be readily prepared for incorporation as the cathode depolarizer of an alkaline dry cell by admixing the precipitate with a particulate material of high electrical conductivity. This is preferred since the permanganate is itself of relatively low conductivity for usage as a cathode member. Any suitable electrical conductive particulate material such as micronized graphite may be employed. The formed cathode depolarizer should contain approximately 5 percent to 25 percent of conductive material by weight, the preferred mixture being constituted of four parts permanganate material and one part electrically conductive particulate material. The following examples are illustrative of particular methods of preparing active cathode material in accordance with the invention.

EXAMPLE 1

An aqueous or ethanol solution of potassium permanganate is added to a 10 percent aqueous solution of tetra-n-propyl ammonium hydroxide. The precipitate of the ensuing reaction is filtered, washed with distilled water and dried in a vacuum dessicator.

EXAMPLES 2-4

The process of the above example is practiced with the tetra-n-propyl ammonium hydroxide aqueous solution being substituted for by tetra-n-butyl, tetra-n-pentyl or tetra-n-hexyl ammonium hydroxide alcohol solutions.

EXAMPLES 5-8

The processes of the above examples are practiced with ammonium chlorides in place of the ammonium hydroxides.

Smaller hydrocarbon radicals such as methyl ($CH_3$) and ethyl ($C_2H_5$) are incapable of forming the permanganate precipitate. Mixtures of the compounds of the examples for production of the permanganate active cathode material are within the contemplation of the invention.

In FIG. 1 there is illustrated a practical alkaline dry cell employing the above-discussed permanganate cathode depolarizer. Reference numeral 10 denotes an anode container or cup formed of a metal such as copper or a copper base alloy. Contained within cup 10 is a body 12 of an anode material compatible with alkaline electrolytes. The anode material is preferably zinc or cadmium. The cell is provided with a cathode container or cup 14 preferably formed of steel containing a cathode depolarizer 16. The interior of cup 14 is preferably graphitized or otherwise treated to present a nonpolarizing layer to the cup contents.

A barrier member 18 comprised of a microporous ionically permeable material such as "Synpor" is placed in contact with cathode depolarizer 16. In general any barrier element employable in conventional alkaline dry cells incorporating metallic oxide cathode depolarizers of mercuric oxide, silver oxide and the like may be used. An alkaline electrolyte-containing member 20, constituted of the well-known absorbents usable in alkaline dry cells such as "Webril" is placed in contact with barrier 18.

The anode and cathode cups are faced into each other and a generally L-shaped grommet 22 of a suitable elastomer such as synthetic rubber, polyethylene or nylon is interposed between their cooperating flanges 24 and 26. Thereupon an outer casing 28 is provided around cathode container 14 to completely jacket the container and substantially all of grommet 19, container 14 being seated in the base 30 of casing 28. The upper edge or mouth portions of the container are radially crimped as illustrated at 32 to complete assembly of the cell. The particular structural details of the cell are illustrated in Colton, U.S. Pat, No. 2,636,062 to which reference may be had for a more detailed description of this type cell construction.

In the assembly of the cathode container 14 and cathode depolarizer 16, the prepared permanganate cathode depolarizer is pressed into container 14 at high pressure, for example, 30,000 pounds per square inch.

Any of the conventionally employed alkaline electrolytes may be used in the cell. In connection with the use of the subject permanganate active cathode material, it has been found beneficial for providing an even higher degree cathode-electrolyte compatibility, to incorporate in the selected alkaline electrolyte a small quantity of the quaternary ammonium compound employed in the formation of the active cathode material. For example, where the initial step in the formation of the permanganate involves the use of tetra-n-propyl ammonium hydroxide the electrolyte may be comprised of a solution of 20percent potassium hydroxide by weight dissolved in a solution of 10percent tetra-n-propyl ammonium hydroxide in water.

Practical cells were constructed for purposes of evaluating open-circuit voltage an durability of an alkaline dry cell employing the active permanganate cathode material of the invention. A cell of the type shown in FIG. 1 was constructed employing a zinc anode, the above-mentioned potassium hydroxide —tetra-n-propyl ammonium hydroxide electrolyte, a "Webril" absorbent, a "Synpor" barrier and a cathode depolarizer comprised of the precipitate thought to be $(C_3H_7)_4 N MnO_4$ admixed with 20 percent micronized graphite by weight. The cathode active material was formed by reaction of potassium permanganate and tetra-n-propyl ammonium hydroxide in water. The quantity of the permanganate material incorporated in the cathode was 0.283 grams.

Open-circuit measurement of the cell indicated an initial potential of 1.65 volts. Thereupon the cell was discharged through a 681 ohm resistor. Initial voltage in load was measured at 1.60 volts. After 26.25 hours the cell voltage was 0.9 volts. At this point more than 55 milliampere- hours were drawn from the 0.283 grams of permanganate.

While the invention has been described with reference to the particular cell construction of FIG. 1, it will be evident that the invention is not limited thereto. Rather, any of the known alkaline dry cell configurations providing self-venting may be readily employed. It is to be noted particularly that the practical cells constructed and tested employed as barrier elements the typical separator employed in present commercial alkaline dry cells comprised of active cathode materials of the metallic oxides such as silver and mercuric oxide. Furthermore, while a particular process for the formation of the permanganate cathode material of the invention has been set forth, the invention contemplates such variations of the process for formation of the defined permanganate as will be evident to those skilled in the art.

What is claimed is:

1. A cathode depolarizer for an alkaline dry cell comprising a mixture of a particulate material of high electrical conductivity and a permanganate reaction product active cathode material; said reaction product consisting of the permanganate anion of a first starting material selected from the group consisting of alkali metal permanganates and alkaline earth metal permanganates, with the quaternary ammonium cation of a second starting material selected from the group consisting of quaternary ammonium hydroxides and quaternary ammonium halides, and said cation bearing alkyl radical having at least three carbon atoms.

2. The cathode depolarizer claimed in claim 1 wherein the mixture is comprised by weight of 5 percent to 25 percent conductive particulate material, and 95 percent to 75 percent permanganate active cathode material.

3. The cathode depolarizer claimed in claim 2 wherein the particulate material is micronized graphite.

4. An alkaline dry cell comprising an anode, a cathode, an alkaline electrolyte and microporous chemically inert barrier means separating said anode and said cathode, said cathode having a permanganate reaction product active cathode material said reaction product consisting of the permanganate anion of a first starting material selected from the group consisting of alkali metal permanganates and alkaline earth metal permanganates, with the quaternary ammonium cation of a second starting material selected from the group consisting of quaternary ammonium hydroxides and quaternary ammonium halides, and said cation bearing alkyl radical having at least three carbon atoms.

5. The alkaline dry cell claimed in claim 4 including further an electrolyte additive comprising a quaternary ammonium compound bearing alkyl radical having at least three carbon atoms.

6. The alkaline dry cell claimed in claim 5 wherein said electrolyte additive is selected from the group consisting of quaternary ammonium hydroxides and halides.